united States Patent [19]

Gruber et al.

[11] 3,987,234

[45] Oct. 19, 1976

[54] ANAEROBICALLY HARDENING ADHESIVES AND SEALANTS CONTAINING AN ORGANIC HYDRAZINES

[75] Inventors: Werner Gruber, Dusseldorf-Gerresheim; Joachim Galinke, Dusseldorf-Holthausen; Jürgen Keil, Monheim-Hitdorf, all of Germany

[73] Assignee: Henkel & Cie G.m.b.H., Dusseldorf-Holthausen, Germany

[22] Filed: Aug. 25, 1975

[21] Appl. No.: 607,463

[30] Foreign Application Priority Data
Sept. 2, 1974  Germany............................ 2441919

[52] U.S. Cl................................. 526/328; 526/218
[51] Int. Cl.² ........................................ C08F 120/10

[58] Field of Search................. 260/89.5 R, 89.5 A, 260/86.1 E; 526/218, 328

[56] References Cited
UNITED STATES PATENTS

| | | | |
|---|---|---|---|
| 3,341,506 | 9/1967 | Wang et al...................... | 260/89.5 R |
| 3,625,930 | 12/1971 | Toback et al.................. | 260/89.5 R |
| 3,775,385 | 11/1973 | Ozono et al. .................. | 260/89.5 A |

*Primary Examiner*—Harry Wong, Jr.
*Attorney, Agent, or Firm*—Hammond & Littell

[57] ABSTRACT

Organic hydrazines are accelerators for aerostable, anaerobically-setting adhesive compositions. They can be used with stabilizers. Preferred hydrazines are aryl hydrazines which carry electronegative groups, for example 2,4-dinitrophenylhydrazine.

12 Claims, No Drawings

ANAEROBICALLY HARDENING ADHESIVES AND SEALANTS CONTAINING AN ORGANIC HYDRAZINES

FIELD OF THE INVENTION

The present invention relates to systems based on (meth) acrylic esters and organic peroxides, particularly hydroperoxides, which harden in the absence of molecular oxygen at an accelerated rate, and which are known as aerostable, anaerobically setting adhesives, sealing compounds and the like. They are used preferably in solvent-free form for the above-mentioned purposes. The invention includes methods for the preparation of the compositions.

As essential components these systems contain monomeric or oligomeric (meth) acrylic esters of mono- or polyhydroxy alcohols as well as a peroxide of hydroperoxide. Preferably the alcohols have molecular weights below about 700. To ensure a sufficiently rapid hardening in the absence of oxygen, accelerators are added to the system.

It is known that certain nitrogen-containing compounds can be used as accelerators. With compounds of this type one obtains after a not too long a time a strength which permits the cemented objects to be handled. The strength of the bonds obtained is generally evaluated according to the so-called "hand strength" test. In this test a few drops of the aerostable, anaerobically hardening adhesive composition are applied, for example, to the threads of a degreased bolt, after which the appropriate nut is screwed over the bolt. From time to time the nut is twisted slightly against the bolt to determine if the adhesive has set. The time that elapses until the nut can no longer be turned by hand is used as the measure of hand strength.

Of greater importance for the use of the anaerobically hardening adhesives and sealing compounds, however, is the time required for the adhesive on the bolts to fail under a torque of at least 50 kpcm.

RELATED ART

A variety of compositions of the foregoing type are disclosed in U.S. Nos. 2,626,178; 2,895,950; 3,041,322; 3,043,820; 3,300,547; 3,046,262; 3,218,305; and 3,425,988.

OBJECTS OF THE INVENTION

A principal object of the present invention is to find accelerators for use in adhesive and sealing compositions of the type described which lead very rapidly to a force-locked connection after the parts have been joined together and yet which have no adverse effect upon the storage stability of the compositions.

A further object of the invention is to provide an aerostable, anaerobically-setting adhesive composition comprising a polymerizable (meth) acrylate ester as principal latent adhesive component, a peroxide polymerization catalyst therefore, and an agent (an organically substituted hydrazine) which accelerates the action of the catalyst in the absence of free oxygen, but which is essentially inert in the presence of free oxygen.

A still further object is to provide a method for accelerating the rate at which aerostable, anaerobically-setting compositions containing a polymerizable meth (acrylate) ester as principal latent adhesive component harden in the absence of free oxygen, by uniformly incorporating in said composition a small but effective amount of an organic hydrazine as agent which accelerates the action of the catalyst.

BRIEF SUMMARY OF THE INVENTION

The present invention provides an aerostable, anaerobically-setting adhesive composition comprising a polymerizable (meth) acrylate ester as principal latent adhesive component, a peroxide polymerization catalyst for the ester, and an organic hydrazine as accelerator for the catalyst. The compositions may contain one or more stabilizers and one or more auxiliary accelerators. In preferred embodiments they are adequately stable at room temperature in the presence of free oxygen, but they harden rapidly when used as a cement with exclusive of air and provide strong metal-to-metal bonds.

According to the invention, the new anaerobically hardening adhesives and sealing compounds based on (meth) acrylic acid esters contain organic hydrazines in addition to the usual auxiliary substances. The hydrazines act as accelerator for the polymerization catalyst normally present.

According to the invention, the new anaerobically hardening adhesives and sealing compounds based on (meth) acrylic esters contain, in addition to the conventional auxiliary substances, an aromatic hydrazine. Preferred are those aromatic hydrazines which contain at least one electro-negative substituent in the aromatic radical. Preferred electro-negative substituents are nitro groups, cyanide groups, and halogen groups particularly bromine and/or chlorine. The aromatic hydrazines can also be further substituted, that is, they can contain additional aryl, as well as alkyl radicals, etc.

Thus in preferred embodiments the compositions of the present invention contains an adhesive component [e.g., an (meth) acrylate ester]; a polymerization initiator or catalyst (e.g., a hydroperoxy alcohol); an oxygen adjuvant an polymerization inhibitor (e.g., a quinone); a stabilizer (e.g., a percarbonic acid); a primary accelerator (a organic hydrazines); and an auxiliary accelerator (e.g., a tertiary amine). The components are mutually soluble or homogeneously dispersible.

The aromatic radical can be a phenyl radical or naphthyl radical. Suitable compounds are, for example, 2-nitro or 3-nitro- or 4-nitro-phenyl hydrazine, 2,4-dinitrophenyl hydrazine, 2-chloro- or 3-chloro- or 4-chlorophenyl hydrazine, or the corresponding bromophenyl hydrazines, 4-fluorophenyl-hydrazine, 4-cyanophenyl hydrazine, the three isomeric dichlorophenyl hydrazines, 2,4-dibromophenylhydrazine, 3-chloro-2-nitro-phenyl hydrazine, 3-chloro-2-methylphenyl hydrazine, 4-chloro-2-methyl-phenyl hydrazine, 4-bromo-2methylphenyl-hydrazine, 5-chloro-2-methoxy-phenyl-hydrazine, 4-hydrazinobiphenyl, 3-nitro-1-hydrazino-naphthalene, and 1-chloro-2-hydrazine-naphthalene.

Also N-methyl-N-phenyl-hydrazine, N-methyl-N'-phenyl-hydrazine, N-propyl-N-phenyl-hydrazine, N,N-diphenyl-hydrazine, N,N'-diphenyl-hydrazine, N,N'-dimethyl-N,N'-diphenyl-hydrazine, N-(2-p-tolysulfonethyl)-N'-phenyl-hydrazine, N'-phenyl-N-(2,5-dichlorophenyl)-hydrazine, N,N'-bis-(2,4-dibromophenyl)-hydrazine, N-methyl-N-(2-nitrophenyl)-hydrazine, N-methyl-N-(2,4-dinitrophenyl)-hydrazine, N,N'-dimethyl-N-(2,4-dinitrophenyl)-hydrazine, N,N-dimethyl-N'-(2,4-dinitrophenyl)-hydrazine, N,N'-di-o-tolyl-hydrazine, N-phenyl-N'-o-tolyl-hydrazine, and thiazolyl-(2)-hydrazine. The alkyl groups can contain 6 or more carbon atoms and can also carry electronegative substituents. The aryl substituents thus can each be mono-, di-, or trisubstituted with nitro, halogen, cyano, $C_{1-3}$ alkyl or $C_{1-3}$ alkoxy substituents.

The aromatic hydrazines should be present approximately in an amount of 0.01% to 10% by weight, particularly 0.5 to 5% by weight, based on the weight of the (meth) acrylic ester.

The organic hydrazines according to the invention can be added to principally all so-called anaerobically hardening adhesives and sealing compounds. These systems are composed, for example, of (meth) acrylic esters of polyhydroxy alcohols having a molecular weight less than about 700 such as ethylene glycol; diethylene glycol; triethylene glycol; tetraethylene glycol; polyethylene glycol; glycerin; pentanediol; di, tri-, or tetrapropylene glycol; or the (meth) acrylic esters of dimerized or polymerized cyclopentadienol, of tetrahydrofuryl alcohol, of cyclopentanol or of cyclohexanol. The reaction products of glycide ethers of polyvalent phenols with acrylic acid or methacrylic acid provide another group of anaerobically hardening adhesives.

Another essential component of the anaerobically hardening adhesives are the peroxide initiators. These are preferably hydroperoxides which derive from hydrocarbons with a chain length of 3 to 18 C-atoms. Suitable, for example, are cumene hydroperoxide, tert.-butyl hydroperoxide, methyl ethyl ketone hydroperoxide, and diisopropyl benzene hydroperoxide. Furthermore those peroxides are also suitable which have a half life period of 10 hours at a temperature between about 80° and 140° C. Here we mention particularly tert.-butyl perbenzoate, di-tert.-butyl-diperoxyphthalate, 2,5-dimethyl-2,5-bis-(tert.-butylperoxy)-hexane,-bis-(1-hydroxy-cyclohexyl)-peroxide,tert.-butyl-peroxyacetate, 2,5-dimethyl-hexyl-2,5,-di-(peroxybenzoate), tert.-butylperoxy-isopropyl carbonate, n-butyl-4,4-bis-(tert.-butylperoxy) valerate, 2,2-bis-(tert.-butylperoxy)-butane and di-tert.-butyl peroxide The peroxides should be present in an amount of 0.1 to 20%, preferably 1.0 to 10%, based on the total weight of the mixture. They are used mostly as phlegmatized (i.e., thickened) solutions or pastes, that is, with a relatively low content of inert substances, for example, dimethyl phthalate, cumene or the like.

According to a preferred embodiment of the invention, stabilizers are added to the anaerobically hardening mixtures, particularly if they contain arylalkyl- and/or dialkyl hydrazones. The stabilizers prevent premature polymerization; that is, they improve the stability of the compositions during storage. Beyond that, they have an accelerating effect on the polymerization of the methacrylic esters under anaerobic conditions. The stabilizers thus possess a double function. Suitable substances which have these properties are, for example, aliphatic monopercarboxylic acids (particularly peracetic acid) and nitrones, like C-phenyl-N-methylnitrone. The use of small amounts (e.g., 0.1% to 5.0% by weight) is generally sufficient. The stabilizer is always the last component which is added to the composition.

In addition to the foregoing, the composition may contain a free radical stabilizer, to prevent gelations when oxygen alone is insufficient for the purpose. Quinones (for example, hydroquinone) are preferred stabiliers for this purpose.

According to another preferred embodiment of the present invention, an organic amine can be used additionally as an auxiliary accelerator together with the organic hydrazine accelerators according to the invention. In this case the systems show their best properties regarding a rapid hardening time. As auxiliary accelerators are mentioned N,N-dimethyl-o-toluidine, N,N-dimethyl-p-toluidine and tri-n-butylamine. They should be used only in very small amounts of 0.1% or up to 2.5% by weight. The auxiliary accelerators are preferably used together with the above-mentioned stabilizers. The amounts of stabilizer depends on the quantative ratios between the hydrazine and the auxiliary amine accelerators. They can be easily adapted to each other by simple preliminary tests to obtain an optimum hardening time and good stability.

Finally thickeners, plasticizers, inorganic fillers and dyes can be added to the adhesive and sealing compounds according to the invention. Suitable as thickeners are polymeric compounds such as polymethyl methacrylate, polyethyl acrylate, polystyrene, polyvinyl chloride, synthetic rubber and the like. As fillers can be used, for example, finely-divided silicon dioxide, silicates, bentonites, calcium carbonate, and titanium dioxide.

The anaerobic adhesives and sealing compounds according to the invention can be stored for months in only partly-filled bottles of glass, polyethylene, etc., without undergoing any change. A relatively low oxygen-partial pressure suffices to inhibit the polymerization. Here as well as in other cases it was found expedient to color the bottles to keep out short-wave light. This has a favorable effect on the stability.

The anaerobically-hardening adhesives are used in the industry for cementing metal sheets or metal parts of different materials or for fastening threads, for sealing pipe joints, etc. Due to the combination according to the invention it is not necessary to use an additional accelerator, even with relatively inactive metal surfaces. Naturally it is also possible to accelerate the hardening with known means, for example, by slight heating.

In general, so-called hand-resistant joints are obtained after a few minutes with the anaerobic adhesives according to the invention. It should be pointed out that the time to obtain a really good strength which permits practical handling, namely, breaking bolt-nut joints with a torque of at least 50 kpcm, is between about 10 and 30 minutes.

In the specification and claims, the term "(meth) acrylate" is used to designate esters of acrylic acid and the esters of methacrylic acid. The esters are termed latent adhesives because they do not develop their adhesive properties until they have polymerized.

The invention is further described in the examples which follow. These examples are preferred embodiments of the invention and are not to be construed in limitation thereof.

EXAMPLE 1

100 g of technical polyethylene glycol dimethacrylate (m.w. approx. 330), which contained 200 p.p.m. of hydroquinone, was mixed under stirring with 0.55 g of 4-nitrophenylhydrazine. Subsequently 1.1 g of N,N-dimethyl-p-toluidine and 5.5 g of a commercial 70% cumene hydroperoxide solution were stirred in successively. As last component was added 0.55 g of a 40% peracetic acid solution (in glacial acetic acid).

EXAMPLE 2

100 g of technical polyethylene glycol dimethacrylate (m.w. approx. 330), which contained 200 p.p.m. of hydroquinone, was mixed with stirring with 0.55 g of 2,4-dinitrophenylhydrazine. Subsequently 1.1 g of N,N-dimethyl-p-toluidine and 5.5 g of a commercial 70% cumene hydroperoxide solution were stirred in successively. As last component was added 1.1 g of a 40% peracetic acid solution (in glacial acetic acid).

In the following table are shown the hand strength (A) found in the Examples, the time required to break the adhesive bond with a torque of 50 kpcm (B), and the strength of the bond after 24 hours (C). In addition, we also tested the stability of the mixtures (D). The explanation for A,B,C and D follow after the table.

TABLE 1

| Ex. | Hand Strength (minutes) | 50 kpcm Torque (minutes) | Strength After 24 hours (kpcm) |
|---|---|---|---|
| 1 | 10 | 15 | 120 |
| 2 | 5 | 15 | 120 |

A. Hand Strength Test

In the hand strength test a few drops of the anaerobically hardening adhesive are placed on the threads of a degreased bolt (M 10 × 30 DIN 933-8.8) and the appropriate nut is screwed over the bolt. From time to time the nut is turned a little against the bolt to determine at what time the nut can be no longer be turned by hand on the bolt. The elapsed time is used as a measure of the hand strength and is shown in column 2 of the Table.

B. Time for Attaining a Torque of at least 50 kpcm.

The strength test is carried out on degreased bolts (M 10 × 30 DIN 933-8.8) and nuts. After the bolt has been joined to the nut with a few drops of the adhesive the torque necessary to break the adhesive joint is determine with a torque wrench at intervals of several minutes. As measure for the strength is considered the time at which a torque of 50 kpcm or more is obtained. Mean values of five measurements are listed in column 3 of the table.

C. Strength After 24 hours

The torque in kpcm required to break the adhesive bond between the nut and bolt after 24 hours of storage at room temperature was determined with a torque wrench. It is listed in column 4 of the table.

D. Stability

In the stability test, a test tube 10 cm long and 10 mm wide was 9/10 filled with the mixture according to Examples 1 to 12 and suspended in a bath maintained at 80° C. The time span from the handing in the bath to the first formation of gel was measured. All samples were still gel-free after one hour. The values respecting the hand strength, the time of the 50 kpcm, strength and the strength after 24 hours were unchanged. The accelerated aging test was stopped, because this test shows that the products remain unchanged for over a year at room temperature.

We claim:

1. In an aerostable, anaerobically-setting adhesive composition comprising a polyermizable (meth) acrylate ester as principal latent adhesive component, an effective amount, in the range of 0.1 to 20% based on the weight of said composition of a hydroperoxide as polymerization catalyst therefor derived from hydrocarbons containing a $C_3$–$C_{18}$ chain, and a nitrogen-containing organic compound as initiator for the polymerization; a small but effective uniformly distributed amount in the range of 0.01 to 10% based on the weight of said ester of an aromatic hydrazine as accelerator for said catalyst.

2. A composition according to claim 1 wherein the accelerator is 4-nitrophenylhydrazine.

3. A composition according to claim 1 wherein the accelerator is 2,4-dinitrophenylhydrazine.

4. A composition according to claim 1 containing an organic amine as auxiliary accelerator.

5. A composition according to claim 1 wherein the auxiliary accelerator is N,N-dimethyl toluidine.

6. A composition according to claim 1 wherein the (meth) acrylate ester is the ester of two mols of methacrylic acid with one mol of ethylene glycol.

7. A composition according to claim 1 wherein the polymerization catalyst is cumene hydroperoxide.

8. A composition according to claim 1 containing a free radical stabilizer.

9. A composition according to claim 8 wherein the free radical stabilizer is hydroquinone.

10. A method for accelerating the setting rate of an aerostable, anaerobically-setting adhesive composition comprising a polymerizable (meth) acrylate ester as principal latent adhesive component and a hydroperoxide polymerization catalyst therefor derived from hydrocarbons containing a $C_3$–$C_{18}$ chain, which comprises uniformly incorporating in said composition a small but effective amount in the range of 0.01 to 10% based on the weight of said ester of an organic hydrazine as accelerator for said catalyst.

11. A method according to claim 10 wherein said hydrazone is incorporated in said composition prior to said catalyst.

12. A composition according to claim 1 wherein the hydrazine contains at least one electronegative substituent.

* * * * *